(12) United States Patent
Fukaya

(10) Patent No.: US 9,425,645 B2
(45) Date of Patent: Aug. 23, 2016

(54) ELECTRONIC APPARATUS, CONTROL METHOD OF ELECTRONIC APPARATUS, AND STORAGE MEDIUM

(71) Applicant: CANON KABUSHIKI KAISHA, Tokyo (JP)

(72) Inventor: Yudai Fukaya, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 425 days.

(21) Appl. No.: 13/761,060

(22) Filed: Feb. 6, 2013

(65) Prior Publication Data

US 2013/0207602 A1 Aug. 15, 2013

(30) Foreign Application Priority Data

Feb. 10, 2012 (JP) ................................ 2012-027539

(51) Int. Cl.
*H02J 7/00* (2006.01)
*H02J 7/04* (2006.01)
*H02J 7/02* (2016.01)
*H02J 5/00* (2016.01)

(52) U.S. Cl.
CPC . *H02J 7/04* (2013.01); *H02J 7/025* (2013.01); *H02J 5/005* (2013.01); *H02J 7/0044* (2013.01); *H02J 2007/0062* (2013.01); *H02J 2007/0096* (2013.01); *Y10T 307/696* (2015.04)

(58) Field of Classification Search
CPC ....................................................... H02J 7/025

USPC .......................................................... 320/108
See application file for complete search history.

(56) References Cited

U.S. PATENT DOCUMENTS

| | | | |
|---|---|---|---|
| 6,246,211 B1 * | 6/2001 | Dalton et al. | 320/114 |
| 2008/0143290 A1 * | 6/2008 | Chavakula | 320/101 |
| 2008/0174277 A1 * | 7/2008 | Ueno | 320/138 |
| 2008/0303486 A1 * | 12/2008 | Kao et al. | 320/139 |
| 2009/0184687 A1 * | 7/2009 | Schroeder et al. | 320/162 |
| 2010/0033018 A1 * | 2/2010 | Fukasawa et al. | 307/80 |
| 2010/0225272 A1 * | 9/2010 | Kirby et al. | 320/108 |
| 2011/0037428 A1 * | 2/2011 | Sakaguchi et al. | 320/107 |
| 2011/0244794 A1 * | 10/2011 | Nakano | 455/41.1 |
| 2012/0043931 A1 * | 2/2012 | Terao et al. | 320/108 |

FOREIGN PATENT DOCUMENTS

| | | |
|---|---|---|
| CN | 101707384 A | 5/2010 |
| CN | 201466761 U | 5/2010 |
| CN | 201820197 U | 5/2011 |
| JP | 2008-067532 A | 3/2008 |
| JP | 2011097669 A | 5/2011 |
| WO | 2008044297 A1 | 4/2008 |

* cited by examiner

*Primary Examiner* — Suresh Memula

(74) *Attorney, Agent, or Firm* — Canon USA, Inc. IP Division

(57) ABSTRACT

An electronic apparatus includes a connection unit for connecting a first power supply device, a power receiving unit for receiving power from a second power supply device wirelessly. The electronic apparatus selects either the first power supply device or the second power supply device based on the power supply capacity of the first power supply device.

20 Claims, 8 Drawing Sheets

ELECTRONIC APPARATUS, CONTROL METHOD OF ELECTRONIC APPARATUS, AND STORAGE MEDIUM

BACKGROUND OF THE INVENTION

1. Field of the Invention

One disclosed aspect of the embodiments relates to an electronic apparatus, a control method of the electronic apparatus, and a storage medium.

2. Description of the Related Art

In recent years, a system configured of a charging device having a primary coil and a mobile phone having a secondary coil has been known. The charging device outputs power via wireless communication instead of using a connector, whereas the mobile phone receives the power supplied from the charging device via the wireless communication.

Japanese Patent Application Laid-Open No. 2008-67532 discusses a mobile phone which receives power from an AC adaptor and a charging device. This mobile phone receives power from the AC adaptor when the mobile phone is connected to the AC adaptor while receiving the power from the charging device when the mobile phone is inserted into the charging device.

In the conventional art, when the mobile phone is connected to the AC adapter and also inserted into the charging device, there may be a case where both the AC adaptor and the charging device supply the mobile phone with the power. In such a case, an excessive amount of power may be supplied to the mobile phone. Therefore, the mobile phone has to select either the AC adaptor or the charging device to receive the power therefrom.

SUMMARY OF THE INVENTION

One disclosed aspect of the embodiments is directed to an electronic apparatus capable of selecting a device for supplying power to the electronic apparatus.

According to an aspect of the embodiments, an electronic apparatus includes a connection unit for connecting a first power supply device, a power receiving unit that receives power from a second power supply device wirelessly, a selection unit that selects either the first power supply device or the second power supply device based on a power supply capacity of the first power supply device, and a control unit that performs predetermined process using power received from a power supply device selected by the selection unit, wherein the predetermined process includes a process for charging a battery connected to the electronic apparatus.

According to an aspect of the embodiments, a control method for controlling an electronic apparatus, wherein the electronic apparatus includes a connection unit for connecting a first power supply device and a power receiving unit for receiving power from a second power supply device wirelessly, includes selecting either the first power supply device or the second power supply device based on a power supply capacity of the first power supply device, and performing predetermined process using power received from a selected power supply device, wherein the predetermined process includes a process for charging a battery connected to the electronic apparatus.

According to an aspect of the embodiments, a computer readable storage medium storing a computer program for causing a computer to execute a control method for controlling an electronic apparatus, wherein the electronic apparatus includes a connection unit for connecting a first power supply device and a power receiving unit for receiving power from a second power supply device wirelessly, includes selecting either the first power supply device or the second power supply device based on a power supply capacity of the first power supply device, and performing predetermined process using power received from a selected power supply device, wherein the predetermined process includes a process for charging a battery connected to the electronic apparatus.

Further features and aspects of the disclosure will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the disclosure and, together with the description, serve to explain the principles of the disclosure.

DESCRIPTION OF THE EMBODIMENTS

Various exemplary embodiments, features, and aspects of the disclosure will be described in detail below with reference to the drawings. One disclosed feature of the embodiments may be described as a process which is usually depicted as a flowchart, a flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed. A process may correspond to a method, a program, a procedure, a method of manufacturing or fabrication, etc. One embodiment may be described by a schematic drawing depicting a physical structure. It is understood that the schematic drawing illustrates the basic concept and may not be scaled or depict the structure in exact proportions.

Figure 1:
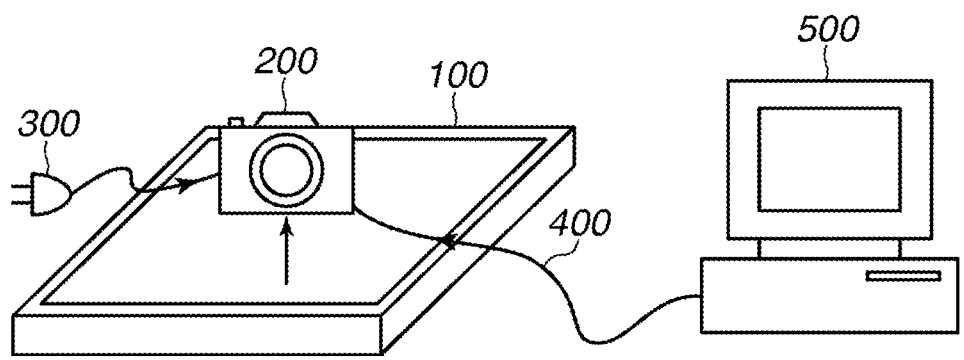
FIG. 1 is a diagram illustrating an example of a power supply system according to a first exemplary embodiment.

As illustrated in FIG. 1, a power supply system according to a first exemplary embodiment includes a power supply device 100, an electronic apparatus 200, a first external device 300, and a second external device 500.

In the power supply system according to the present exemplary embodiment, when the power supply device 100 and the electronic apparatus 200 exists within a predetermined range, the power supply device 100 supplies power the electronic apparatus 200 with power wirelessly. Further, when the power supply device 100 and the electronic apparatus 200 exists within a predetermined range, the electronic apparatus 200 receives power output from the power supply device 100 wirelessly. In a case where the power supply device 100 and the electronic apparatus 200 does not exist within the predetermined range, the electronic apparatus 200 cannot receive power from the power supply device 100. "The predetermined range" is a range where the power supply device 100 and the electronic apparatus 200 can communicate with each other.

Further, the first external device 300 supplies power to the electronic apparatus 200, while the second external device 500 supplies power to the electronic apparatus 200 via a cable 400.

The electronic apparatus 200 may be an image capturing apparatus such as a camera, or a reproducing apparatus which reproduces audio data and video data. In addition, the electronic apparatus 200 may be a mobile device such as a mobile phone or a smartphone. Further, the electronic apparatus 200 may be a battery pack which includes batteries.

The electronic apparatus 200 may be an apparatus such as an automobile driven by power supplied from the power supply device 100. Furthermore, the electronic apparatus 200 may be an apparatus for receiving television broadcasting, a display monitor for displaying video data, or a personal computer. In addition, the electronic apparatus 200 may be an apparatus which operates with power supplied from the power supply device 100 even if a battery 215 is not attached thereto.

The first external device 300 is a power conversion device which converts commercial power into direct-current (DC) power. For example, the first external device 300 is an alternating-current (AC) adapter.

The second external device 500 is a personal computer or a television, for example. The cable 400 is a predetermined interface according to the Universal Serial Bus (USB) standard. The second external device 500 may supply the electronic apparatus 200 with power via the cable 400. Further, the second external device 500 may be a device functioning as a host in the USB standard.

Figure 2:
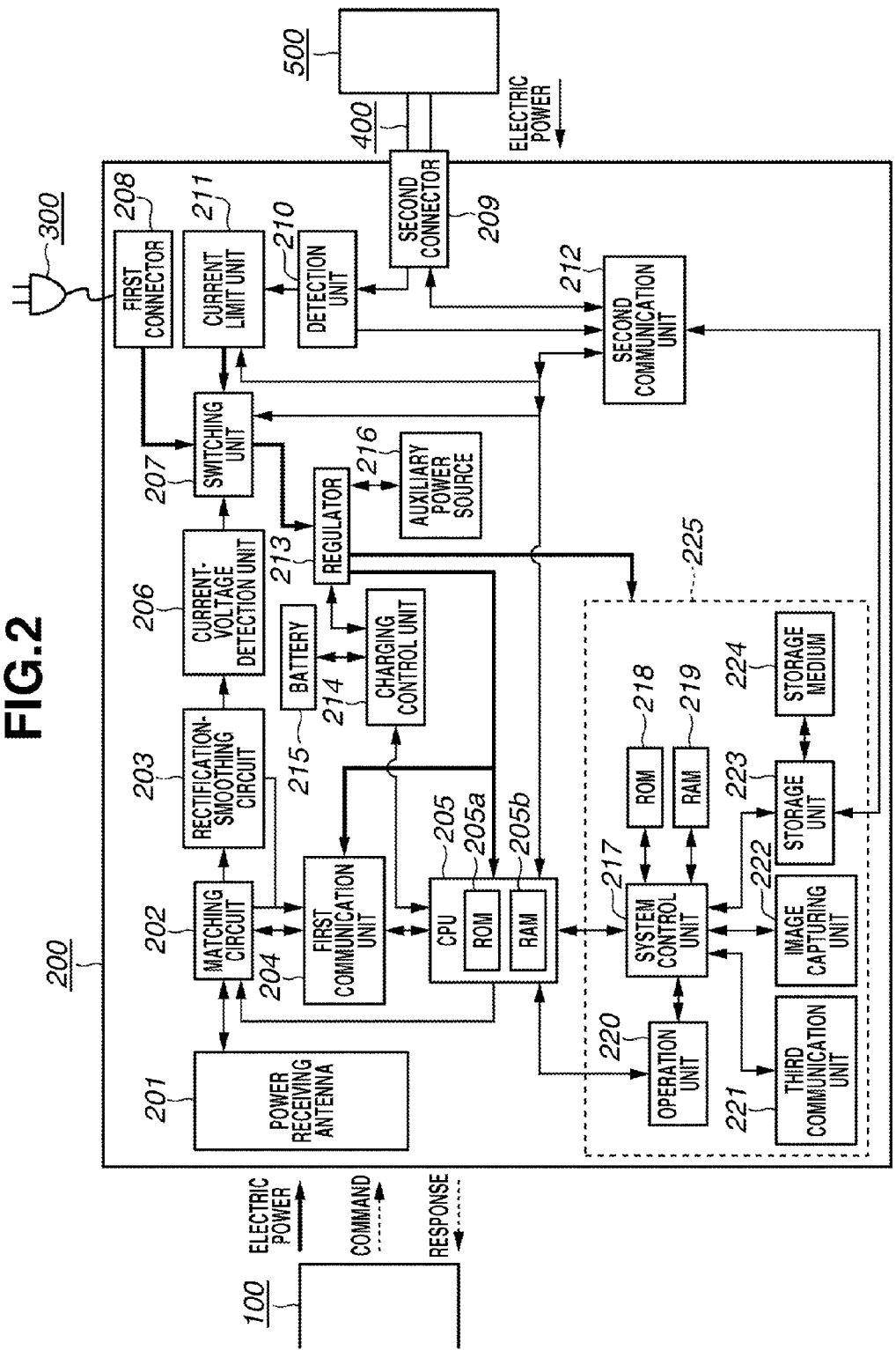
FIG. 2 is a block diagram illustrating an example of the power supply system according to the first exemplary embodiment.

In FIG. 2, the power supply device 100 of the power supply system according to the present exemplary embodiment supplies power to the electronic apparatus 200 by a resonant method. In the resonant method, the power supply device 100 supplies power to the electronic apparatus 200 while the power supply device 100 and the electronic apparatus 200 are resonating.

The power supply device 100 and the electronic apparatus 200 may be resonated by matching the resonant frequency of the electronic apparatus 200 to the resonant frequency of the power supply device 100.

The resonant frequency of the power supply device 100 and the resonant frequency of the electronic apparatus 200 may be commercial frequencies (i.e., 50 Hz/60 Hz), frequencies of 10 MHz to tens of megahertz, or frequencies of 13.56 MHz.

The power supply device 100 may communicate with the electronic apparatus 200 via wireless communication compliant with the Near Field Communication (NFC) standard. Therefore, via the wireless communication compliant with the NFC standard, the power supply device 100 transmits data for controlling the electronic apparatus 200 and acquires data for controlling power supply from the electronic apparatus 200.

The power supply device 100 outputs either a first power or a second power. The power supply device 100 supplies the first power to the electronic apparatus 200 in order to communicate with the electronic apparatus 200 via the wireless communication compliant with the NFC standard. The power supply device 100 supplies the second power to the electronic apparatus 200 in order to supply power to the electronic apparatus 200.

For example, power of the first power is equal to or less than 1 W, whereas power of the second power ranges between 2 W to 10 W. The power of the second power may be equal to or greater than 10 W. In addition, the power of the first power is less than that of the second power.

Further, as long as the power supply device 100 may use the power so as to perform the wireless communication compliant with the NFC standard, the power of the first power is not limited to the power equal to or less than 1 W. In a case where the power supply device 100 supplies the second power to the electronic apparatus 200, the power supply device 100 cannot communicate with the electronic apparatus 200 via the wireless communication compliant with the NFC standard.

The power supply device 100 may alternately execute process of performing the wireless communication compliant with the NFC standard by outputting the first power, and process of supplying the power to the electronic apparatus 200 by outputting the second power. In this manner, the power supply device 100 may properly supply the power to the electronic apparatus 200 according to the data acquired from the electronic apparatus 200 via the wireless communication compliant with the NFC standard.

Next, a configuration example of the electronic apparatus 200 will be described with reference to FIG. 2. The electronic apparatus 200 includes a power receiving antenna 201, a matching circuit 202, a rectification-smoothing circuit 203, a first communication unit 204, a central processing unit (CPU) 205, a current-voltage detection unit 206, a switching unit 207, a first connector 208, a second connector 209, and a detection unit 210. Further, the electronic apparatus 200 includes a current limit unit 211, a second communication unit 212, a regulator 213, a charging control unit 214, a battery 215, an auxiliary power source 216, a system control unit 217, a read only memory (ROM) 218, a random access memory (RAM) 219, and an operation unit 220. The electronic apparatus 200 further includes a third communication unit 221, an image capturing unit 222, a storage unit 223, and a storage medium 224.

A system configured of the system control unit 217, the ROM 218, the RAM 219, the operation unit 220, the third communication unit 221, the image capturing unit 222, the storage unit 223, and the storage medium 224 is referred to as a predetermined system 225.

The power receiving antenna 201 receives the power supplied from the power supply device 100. The electronic apparatus 200 receives the power from the power supply device 100 and communicates with the power supply device 100 via the wireless communication compliant with the NFC standard via the power receiving antenna 201. A helical antenna, a loop antenna, or a planar antenna such as a meander line antenna may be employed as the power receiving antenna 201.

The matching circuit 202 serves as a resonance circuit for matching the resonant frequency of the power supply device 100 with the resonant frequency "f" of the electronic apparatus 200. The matching circuit 202 includes a variable capacitor and a variable coil. The CPU 205 controls the variable capacitor and the variable coil included in the matching circuit 202 to cause the power supply device 100 and the electronic apparatus 200 to resonant with each other. The matching circuit 202 supplies the rectification-smoothing circuit 203 with the power received by the power receiving antenna 201.

The rectification-smoothing circuit 203 removes a command from the power received by the power receiving antenna 201, and generates direct-current (DC) power. Further, the rectification-smoothing circuit 203 supplies the regulator 213 with the generated DC power via the current-voltage detection unit 206 and the switching unit 207. The rectification-smoothing circuit 203 supplies the first communication unit 204 with the command that has been removed from the power received by the power receiving antenna 201.

The first communication unit 204 acquires the command supplied from the rectification-smoothing circuit 203, and analyzes the command according to a protocol compliant with the NFC standard. Further, the first communication unit 204 supplies an analysis result of the command to the CPU 205.

In a case where the power supply device 100 supplies the first power to the electronic apparatus 200, the CPU 205 performs load modulation. This enables response data with respect to the command received from the power supply device 100 to be transmitted to the power supply device 100.

The CPU 205 includes a ROM 205a and a RAM 205b. The CPU 205 controls the electronic apparatus 200 according to the analysis result of the command supplied from the first communication unit 204.

Further, the CPU 205 controls the electronic apparatus 200 according to the computer program stored in the ROM 205a. In addition, the CPU 205 may supply the system control unit 217 with an instruction for controlling the system control unit 217.

A computer program for controlling the electronic apparatus 200 is stored in the ROM 205a. The information relating to the electronic apparatus 200 and parameters relating to the processing performed by the electronic apparatus 200 are stored in the ROM 205a. The RAM 205b is a rewritable memory where the computer program for controlling the electronic apparatus 200 and data received from the power supply device 100 are stored. Further, flags relating to the electronic apparatus 200 are stored in the RAM 205b.

In addition, a first flag f1, a second flag f2, a third flag f3, and a fourth flag f4 are stored in the RAM 205b. The first flag f1, the second flag f2, the third flag f3, and the fourth flag f4 will be described below.

The current-voltage detection unit 206 detects voltage and current of the power supplied from the rectification-smoothing circuit 203. The current-voltage detection unit 206 supplies current information and voltage information to the CPU 205. The current information indicates the detected current, whereas the voltage information indicates the detected voltage.

The switching unit 207 serves as a switch for supplying the regulator 213 with the power supplied from any one of the power supply device 100, the first external device 300, and the second external device 500. The CPU 205 selects a device for supplying the power to the regulator 213 from among the power supply device 100, the first external device 300, and the second external device 500. Then, the CPU 205 controls the switching unit 207 so that the power from the selected device is supplied to the regulator 213.

The CPU 205 may also control the switching unit 207 not to supply the power to the regulator 213 from the power supply device 100, the first external device 300, and the second external device 500.

The first connector 208 includes a connection terminal for connecting the first external device 300 thereto. When the first external device 300 is connected to the electronic apparatus 200 via the first connector 208, the power supplied from the first external device 300 is supplied to the regulator 213 via the switching unit 207 and the first connector 208.

The second connector 209 includes a connection terminal for connecting the second external device 500 thereto via the cable 400. When the second external device 500 is connected to the electronic apparatus 200 via the second connector 209, the power supplied from the second external device 500 is supplied to the regulator 213 via the switching unit 207 and the second connector 209. The second connector 209 includes a VBUS terminal, a GND terminal, a D+ terminal, and a D− terminal.

The detection unit 210 detects electric potential of the D+ terminal and electric potential of the D− terminal included in the second connector 209, and detects the type of power source of the second external device 500.

A Standard Downstream Port, a Charging Downstream Port, and a Dedicated Charging Port are types of power sources specified in the USB Battery Charging Specification. The detection unit 210 detects whether the second external device 500 complies with any one of the Standard Downstream. Port, the Charging Downstream Port, and the Dedicated Charging Port.

The Standard Downstream Port may supply the electronic apparatus 200 with the maximum current of 500 mA. Hereinafter, the Standard Downstream Port is referred to as "SDP". The Charging Downstream Port may supply the electronic apparatus 200 with the maximum current of 1500 mA. Hereinafter, the Charging Downstream Port is referred to as "CDP".

The Dedicated Charging Port may supply the electronic apparatus 200 with the maximum current of 1500 mA. Hereinafter, the Dedicated Charging Port is referred to as "DCP".

When the detection unit 210 detects the power source type of the second external device 500, the detection unit 210 informs the CPU 205 of the power source type of the second external device 500. The detection unit 210 may detect the power source type of the second external device 500 by detecting the amount of current that may be supplied to the electronic apparatus 200 from the second external device 500.

The CPU 205 may detect a power supply capacity of the second external device 500 according to the type of the power source of the second external device 500 detected by the detection unit 210.

When the second external device 500 is connected to the second connector 209 via the cable 400, the current limit unit 211 limits current supplied from the second external device 500 via the VBUS terminal according to the type of the power source detected by the detection unit 210.

For example, in a case where the second external device 500 complies with the SDP, the current limit unit 211 limits the current supplied from the second external device 500 via the VBUS terminal to be equal to or less than 500 mA.

In a case where the second external device 500 complies with the CDP, for example, the current limit unit 211 limits the current supplied from the second external device 500 via the VBUS terminal to be equal to or less than 1500 mA. Furthermore, in a case where the second external device 500 complies with the DCP, for example, the current limit unit 211 limits the current supplied from the second external device 500 via the VBUS terminal to be equal to or less than 1500 mA.

In addition, depending on the type of the power source of the second external device 500, the current limit unit 211 may limit the current supplied from the second external device 500 via the VBUS terminal to be equal to or less than 100 mA. The current that has been limited by the current limit unit 211 is supplied to the regulator 213 via the switching unit 207.

When the D+ terminal and the D− terminal of the second connector 209 are connected to the second communication unit 212, the second communication unit 212 communicates with the second external device 500 via the cable 400.

The second communication unit 212 may transmit data supplied from the storage unit 223 to the second external device 500 via the cable 400 and receive data from the second external device 500 via the cable 400. When the second communication unit 212 receives data from the second external device 500, the second communication unit 212 supplies the received data to the storage unit 223.

The regulator 213 supplies the CPU 205 and the first communication unit 204 with the power supplied from the switching unit 207. In a case where the battery 215 is not fully charged, the regulator 213 supplies the charging control unit 214 and the battery 215 with the power supplied from the switching unit 207.

Further, in a case where the battery 215 is not connected to the electronic apparatus 200, the regulator 213 supplies the auxiliary power source 216 with the power supplied from the switching unit 207. In a case where an instruction for turning on the power of the electronic apparatus 200 is input via the operation unit 220, the regulator 213 supplies the predetermined system 215 with the power supplied from the switching unit 207.

Further, when the battery 215 is connected to the electronic apparatus 200 while the battery 215 is not being charged, the battery 215 supplies the power to the regulator 213. Then, the regulator 213 supplies the power received from the battery 215 to the CPU 205 and the first communication unit 204.

In addition, when the instruction for turning on the power of the electronic apparatus 200 is input via the operation unit 220, the regulator 213 may supply the power received from the battery 215 to the predetermined system 225.

Further, in a case where the battery 215 is not connected to the electronic apparatus 200, the auxiliary power source 216 supplies power to the regulator 213. At this time, the regulator 213 supplies power received from the auxiliary power source 216 to the CPU 205 and the first communication unit 204.

In addition, when the battery 215 is not connected to the electronic apparatus 200 and the instruction for turning on the power of the electronic apparatus 200 is input via the operation unit 220, the regulator 213 may supply power received from the auxiliary power source 216 to the predetermined system 225.

A DC converter, a switching regulator, a series regulator, or a linear regulator may be used as the regulator 213. The regulator 213 supplies power according to an instruction from the CPU 205.

The charging control unit 214 uses power supplied from the regulator 213 so as to charge the battery 215. Further, the charging control unit 214 detects the voltage of the battery 215, and informs the CPU 205 of the detected voltage of the battery 215.

The charging control unit 214 further detects a remaining level of the battery 215, and informs the CPU 205 of the detected remaining level of the battery 215. The battery 215 is a removable battery that may be removed from the electronic apparatus 200. Further, the battery 215 is a rechargeable secondary battery such as a lithium-ion battery. The battery 215 may be a battery other than the lithium-ion battery.

The auxiliary power source 216 supplies power to the electronic apparatus 200 in place of the battery 215 when the battery 215 and the electronic apparatus 200 are disconnected. The auxiliary power source 216 includes a capacitor with large electrostatic capacity.

The system control unit 217 controls the predetermined system 225 according to the computer program stored in the ROM 218. Further the system control unit 217 controls the predetermined system 225 according to the instruction from the CPU 205. In addition, the system control unit 217 may control the CPU 205.

The computer program for controlling the electronic apparatus 200 is stored in the ROM 218. Further, the information relating to the electronic apparatus 200 is stored in the ROM 218. The RAM 219 is a rewritable memory in which the computer program for controlling the electronic apparatus 200 and the data received from the power supply device 100 are stored.

The operation unit 220 provides a user interface for operating the electronic apparatus 200. The operation unit 220 includes a power button and a mode switching button of the electronic apparatus 200. Each button is configured of a switch or a touch panel.

When a user operates the operation unit 220, a signal according to the user's operation is input from the operation unit 220 to the CPU 205 and the system control unit 217. The CPU 205 and the system control unit 217 control the electronic apparatus 200 according to the user's instruction input from the operation unit 220.

The third communication unit 221 communicates with the power supply device 100 via wireless communication compliant with the wireless local area network (LAN) standard. According to the wireless LAN standard, the third communication unit 221 receives data from the power supply device 100. This data includes at least any one of video data, audio data, and a command.

Further, the third communication unit 221 transmits data to the power supply device 100 according to the wireless LAN standard. This data includes at least any one of the video data, the audio data, and the command. The video data and the audio data that has been received from the power supply device 100 are supplied to the storage unit 223 from the third communication unit 221.

The video data and the audio data transmitted to the power supply device 100 from the third communication unit 221 are the data read out from the storage medium 224 by the storage unit 223. The command that has been received from the power supply device 100 is supplied to the system control unit 217 from the third communication unit 221.

The image capturing unit 222 includes an image sensor, an image processing circuit, and a compression-decompression circuit. The image sensor generates video data from an optical image of an object. The image processing circuit performs image processing on the video data generated by the image sensor. The compression-decompression circuit compresses the video data and decompresses the compressed video data. The image capturing unit 222 captures an image of the object and acquires a still image and a moving image. The image capturing unit 222 supplies the storage unit 223 with acquired video data of the still image and the moving image.

The storage unit 223 stores data in the storage medium 224. This data is supplied from any one of the image capturing unit 222, the second communication unit 212, and the third communication unit 221. The storage unit 223 reads out the data from the storage medium 224, and supplies the data to either the second communication unit 212 or the third communication unit 221.

A hard disk or a memory card may be used as the storage medium 224. In addition, the storage medium 224 may be built in the electronic apparatus 200, or an external storage medium that may be removed from the electronic apparatus 200 may be used as the storage medium 224.

The configuration of the predetermined system 225 is not limited to the above-described configuration. The predetermined system 225 may further include a unit other than the units included in the above-described configuration.

Further, the number of units which configures the predetermined system 225 may be less than the number of the above-described units. Any configuration may be applicable to the predetermined system 225 as long as the predetermined system 225 includes a load unit to which power needs to be supplied when the power of the electronic apparatus 200 is turned on.

The state in which the power of electronic apparatus 200 is turned on refers to a state in which the activation of the predetermined system 225 has been completed. The state in which the power of electronic apparatus 200 is turned off refers to a state in which the activation of the predetermined system 225 has not been completed. Further, the state in which the power of the electronic apparatus 200 is turned off also refers to a state in which power is not supplied to the predetermined system 225.

The power supply system according to the present exemplary embodiment may be applied to a system in which the power supply device 100 performs power supply wirelessly with respect to the electronic apparatus 200 by an electromagnetic field coupling method.

The power supply system according to the present exemplary embodiment may also be applied to a system in which the power supply device 100 performs the power supply wirelessly with respect to the electronic apparatus 200 by an electric field coupling method where electrodes are provided respectively on the power supply device 100 and the electronic apparatus 200.

Further, the power supply system according to the present exemplary embodiment may be applied to a system in which the power supply device 100 performs the power supply wirelessly with respect to the electronic apparatus 200 by an electromagnetic induction method.

The power supply by wireless may be reworded as "contactless power supply", or "non-contact power supply".

<First Activation Process>

Next, a first activation process performed by the electronic apparatus 200 in the present exemplary embodiment will be described with reference to a flowchart in FIG. 3. The first activation process may be realized by the CPU 205 executing the computer program stored in the ROM 205a.

In a state where the first external device 300 is connected to the electronic apparatus 200 while the battery 215 is connected to the electronic apparatus 200, the first activation process is performed if an instruction for changing a state of the power of the electronic apparatus 200 from "OFF" to "ON" is input via the operation unit 220.

In step S301, the CPU 205 determines whether the first connector 208 is connected to the first external device 300. When the CPU 205 determines that the first connector 208 is connected to the first external device 300 (YES in step S301), the process proceeds to step S305 from step S301. When the CPU 205 determines that the first connector 208 is not connected to the first external device 300 (NO in step S301), the process proceeds to step S302 from step S301.

In step S302, the CPU 205 sets the first flag f1 stored in the RAM 205b to OFF. Then, the process proceeds to step S303 from step S302. In a case where the information indicating that the first external device 300 is selected is stored in the RAM 205b, the CPU 205 deletes from the RAM 205b the information indicating that the first external device 300 is selected.

The first flag f1 indicates whether the electronic apparatus 200 may receive power from the first external device 300. In a case where the first flag f1 is set to ON, the CPU 205 determines that the electronic apparatus 200 may receive power from the first external device 300. In a case where the first flag f1 is set to OFF, the CPU 205 determines that the electronic apparatus 200 cannot receive power from the first external device 300.

In step S303, the CPU 205 stops the process performed by the predetermined system 225, and controls the regulator 213 not to supply power to the predetermined system 225. Then, the process proceeds to step S304 from step S303.

In step S304, the CPU 205 performs the wireless communication compliant with the NFC standard so as to inform the power supply device 100 of status data. This status data indicates that power supplied to the predetermined system 225 from the first external device 300 is stopped. Thereafter, the CPU 205 ends the process.

In step S305, the CPU 205 sets the first flag f1 stored in the RAM 205b to ON. Then, the process proceeds to step S306 from step S305.

In step S306, the CPU 205 selects the first external device 300 as a device for supplying power to the electronic apparatus 200. At this time, the CPU 205 controls the switching unit 207 to supply the regulator 213 with power that has been supplied from the first external device 300. Then, the CPU 205 stores in the RAM 205b the information indicating that the first external device 300 is selected. Then, the process proceeds to step S307 from step S306.

In step S307, the CPU 205 controls the charging control unit 214 to charge the battery 215. The charging control unit 214 charges the battery 215 by using power supplied to the charging control unit 214 and the battery 215 from the first external device 300 via the regulator 213. Then, the process proceeds to step S308 from step S307.

In step S308, the CPU 205 controls the regulator 213 to supply power supplied from the first external device 300 to the predetermined system 225 via the regulator 213. Further, the CPU 205 inputs an activation signal for activating the predetermined system 225 to the system control unit 217. Through this, the system control unit 217 uses power supplied from the first external device 300 so as to start the process for activating the predetermined system 225. Then, the process proceeds to step S309 from step S308.

In a case where a predetermined instruction for performing the predetermined process is input from the operation unit 220 to the system control unit 217 after the activation of the predetermined system 225, the system control unit 217 uses power supplied from the first external device 300 so as to perform the predetermined process. The predetermined process is the process relating to the predetermined system 225.

For example, the predetermined process includes at least any one of, the process relating to image capturing, the process relating to recording, the process relating to reproducing, the process relating to the third communication unit 221, and the process relating to the second communication unit 212. The predetermined process may be the process other than the above described processes as long as the process is related to the predetermined system 225.

In step S309, the CPU 205 performs the wireless communication compliant with the NFC standard so as to inform the power supply device 100 of status data. The status data indicates that power from the first external device 300 is supplied to the predetermined system 225. Then, the process proceeds to step S309 from step S310.

In step S310, the CPU 205 determines whether the electronic apparatus 200 is connected to the battery 215. When the CPU 205 determines that the electronic apparatus 200 is connected to the battery 215 (YES in step S310), the CPU 205 ends the process.

When the CPU 205 determines that the electronic apparatus 200 is not connected to the battery 215 (NO in step S310), the process proceeds to step S311 from step S310. In a case where the CPU 205 determines that the electronic apparatus 200 is not connected to the battery 215 (NO in step S310), the CPU 205 causes the first external device 300 so as to supply power to the predetermined system 225. With this, power is continuously supplied to the predetermined system 225 even if the battery 215 has been removed from the electronic apparatus 200. This enables the predetermined system 225 not to stop the process. In addition, in a case where the CPU 205 determines that the electronic apparatus 200 is not connected to the battery 215 (NO in step S310), the CPU 205 causes the first external device 300 so as to supply power to the auxiliary power source 216.

In step S311, the CPU 205 performs the wireless communication compliant with the NFC standard so as to inform the power supply device 100 of data indicating that the battery 215 has been removed from the electronic apparatus 200. Thereafter, the CPU 205 ends the process.

In step S307, the CPU 205 charges the battery 215 by using power supplied from the first external device 300. However, the CPU 205 may omit the process performed in step S307 and perform the process in step S308 after selecting the first external device 300 in step S306. In this case, the CPU 205 does not charge the battery 215 by using power supplied from the first external device 300. However, the CPU 205 causes the first external device 300 to supply power to the predetermined system 225, and activates the predetermined system 225.

<Second Activation Process>

Next, a second activation process performed by the electronic apparatus 200 in the present exemplary embodiment will be described with reference to a flowchart in FIG. 4. The second activation process may be realized by the CPU 205 executing the computer program stored in the ROM 205a.

In a state where the second external device 500 is connected to the electronic apparatus 200 and the battery 215 is connected to the electronic apparatus 200, the second activation process is performed if an instruction for changing a state of the power of the electronic apparatus 200 from "OFF" to "ON" is input via the operation unit 220.

In step S401, the CPU 205 determines whether the second connector 209 is connected to the second external device 500 via the cable 400. When the CPU 205 determines that the second connector 209 is connected to the second external device 500 via the cable 400 (YES in step S401), the process proceeds to step S405 from step S401.

When the CPU 205 determines that the second connector 209 is not connected to the second external device 500 via the cable 400 (NO in step S401), the process proceeds to step S402 from step S401.

In step S402, the CPU 205 sets the second flag f2 and the third flag f3 stored in the RAM 205b to OFF. Then, the process proceeds to step S403 from step S402. In a case where the information indicating that the second external device 500 is selected is stored in the RAM 205b, the CPU 205 deletes from the RAM 205b the information indicating that the second external device 500 is selected.

The second flag f2 indicates whether the electronic apparatus 200 may receive power from the second external device 500 corresponding to the SDP. In a case where the second flag f2 is set to ON, the CPU 205 determines that the electronic apparatus 200 may receive power from the second external device 500 corresponding to the SDP.

In a case where the second flag f2 is set to OFF, the CPU 205 determines that the electronic apparatus 200 cannot receive power from the second external device 500 corresponding to the SDP.

The third flag f3 indicates whether the electronic apparatus 200 may receive power from the second external device 500 corresponding to the CDP or the DCP.

In a case where the third flag f3 is set to ON, the CPU 205 determines that the electronic apparatus 200 may receive power from the second external device 500 corresponding to the CDP or the DCP.

In a case where the third flag f3 is set to OFF, the CPU 205 determines that the electronic apparatus 200 cannot receive power from the second external device 500 corresponding to the CDP or the DCP.

In step S403, the CPU 205 stops the process performed by the predetermined system 225, and controls the regulator 213 not to supply power to the predetermined system 225. Then, the process proceeds to step S404 from step S403.

In step S404, the CPU 205 performs the wireless communication compliant with the NFC standard so as to inform the power supply device 100 of status data. The status data indicates that power supplied to the predetermined system 225 from the second external device 500 is stopped. Thereafter, the CPU 205 ends the process.

In step S405, the CPU 205 selects the second external device 500 as a device for supplying power to the electronic apparatus 200. At this time, the CPU 205 controls the switching unit 207 to supply the regulator 213 with power supplied from the second external device 500. Then, the CPU 205 stores in the RAM 205b the information indicating that the second external device 500 is selected. Thereafter, the process proceeds to step S406 from step S405.

In step S406, according to the type of the power source of the second external device 500 detected by the detection unit 210, the CPU 205 determines whether the second external device 500 complies either with the CDP or the DCP. When the CPU 205 determines that the second external device 500 complies either with the CDP or the DCP (YES in step S406), the process proceeds to step S414 from step S406.

When the CPU 205 determines that the second external device 500 complies neither with the CDP nor the DCP (NO in step S406), the CPU 205 determines that the second external device 500 complies with the SDP. In a case where the CPU 205 determines that the second external device 500 complies neither with the CDP nor the DCP (NO in step S406), the process proceeds to step S407 from step S406.

The CPU 205 may determine whether the external device 500 complies either with the CDP or the DCP by determining whether the current that may be supplied to the electronic apparatus 200 from the second external device 500 is greater than a predetermined current.

In this case, for example, the predetermined current is 500 mA. Further, a value of the current that may be supplied to the electronic apparatus 200 from the second external device 500 may be a value measured by the electronic apparatus 200.

In a case where the current that may be supplied to the electronic apparatus 200 from the second external apparatus 500 is greater than the predetermined current, the CPU 205 determines that the second external device 500 complies either with the CDP or the DCP. When the CPU 205 determines that the current that may be supplied to the electronic apparatus 200 from the second external apparatus 500 is greater than the predetermined current (YES in step S406), the process proceeds to step S414 from step S406.

In a case where the current that may be supplied to the electronic apparatus 200 from the second external apparatus 500 is not greater than the predetermined current, the CPU 205 determines that the second external device 500 complies with the SDP. When the CPU 205 determines that the current that may be supplied to the electronic apparatus 200 from the second external apparatus 500 is not greater than the predetermined current (NO in step S406), the process proceeds to step S407 from step S406.

In step S407, the CPU 205 sets the second flag f2 stored in the RAM 205b to ON. Then, the process proceeds to step S408 from step S407.

In step S408, the CPU 205 controls the charging control unit 214 to charge the battery 215. The charging control unit 214 charges the battery 215 by using the power supplied to the charging control unit 214 and the battery 215 from the second external device 500 via the regulator 213. Then, the process proceeds to step S409 from step S408.

In step S409, the CPU 205 determines whether the voltage of the battery 215 is equal to or higher than a first predetermined value. When the CPU 205 determines that the voltage of the battery 215 is equal to or higher than the first predetermined value (YES in step S409), the process proceeds to step S410 from step S409. When the CPU 205 determines that the voltage of the battery 215 is lower than the first predetermined value (NO in step S409), the CPU 205 repeats the process in step S409.

The first predetermined value represents a voltage value. For example, the first predetermined value is 3.2 V. When the CPU 205 determines that the voltage of the battery 215 is lower than the first predetermined value (NO in step S409), the charging control unit 214 charges the battery 215 by using 100 mA of the current supplied from the second external device 500.

In step S410, the CPU 205 controls the regulator 213 to supply the power supplied from the second external device 500 to the predetermined system 225 via the regulator 213. Further, the CPU 205 inputs an activation signal to the system control unit 217. Through this, the system control unit 217 uses power supplied from the second external device 500 so as to start the process for activating the predetermined system 225.

Further, according to the USB standard, the CPU 205 performs enumeration with respect to the second external device 500. In a case where the CPU 205 performs the enumeration with respect to the second external device 500, the CPU 205 may control the current supplied to the electronic apparatus 200 from the second external device 500 to be 500 mA. Then, the process proceeds to step S411 from step S410.

In step S411, the CPU 205 performs the wireless communication compliant with the NFC standard so as to inform the power supply device 100 of status data. The status data indicates that the power is supplied to the predetermined system 225 from the second external device 500. At this time, the status data may include the data indicating that the second external device 500 complies with the SDP. Then, the process proceeds to step S412 from step S411.

In step S412, the CPU 205 determines whether the electronic apparatus 200 is connected to the battery 215. When the CPU 205 determines that the electronic apparatus 200 is connected to the battery 215 (YES in step S412), the CPU 205 ends the process.

When the CPU 205 determines that the electronic apparatus 200 is not connected to the battery 215 (NO in step S412), the process proceeds to step S413 from step S412.

In step S413, the CPU 205 performs the wireless communication compliant with the NFC standard so as to inform the power supply device 100 of data indicating that the battery 215 has been removed from the electronic apparatus 200. Then, the process proceeds to step S402 from step S413.

In step S414, the CPU 205 sets the third flag f3 stored in the RAM 205b to ON. Then, the process proceeds to step S415 from step S414.

In step S415, the CPU 205 controls the charging control unit 214 to charge the battery 215. The charging control unit 214 charges the battery 215 by using the power supplied to the charging control unit 214 and the battery 215 from the second external device 500 via the regulator 213. Then, the process proceeds to step S416 from step S415.

In step S416, the CPU 205 controls the regulator 213 to supply power supplied from the second external device 500 to the predetermined system 225 via the regulator 213. Further, the CPU 205 inputs an activation signal to the system control unit 217. Through this, the system control unit 217 uses the power supplied from the second external device 500 so as to start the process for activating the predetermined system 225. Then, the process proceeds to step S417 from step S416.

In step S417, the CPU 205 performs the wireless communication compliant with the NFC standard so as to inform the power supply device 100 of status data. The status data indicates that the power is supplied to the predetermined system 225 from the second external device 500. At this time, the status data may include the data indicating that the second external device 500 complies either with the CDP or the DCP. Then, the process proceeds to step S418 from step S417.

In step S418, the CPU 205 determines whether the electronic apparatus 200 is connected to the battery 215. When the CPU 205 determines that the electronic apparatus 200 is connected to the battery 215 (YES in step S418), the CPU 205 ends the process.

When the CPU 205 determines that the electronic apparatus 200 is not connected to the battery 215 (NO in step S418), the process proceeds to step S419 from step S418.

In a case where the CPU 205 determines that the electronic apparatus 200 is not connected to the battery 215 (NO in step S418), the CPU 205 causes the second external device 500 so as to supply the power to the predetermined system 225. With this, the power is continuously supplied to the predetermined system 225 even if the battery 215 has been removed from the electronic apparatus 200. This enables the predetermined system 225 not to stop the process. In addition, in the case where the CPU 205 determines that the electronic apparatus 200 is not connected to the battery 215 (NO in step S418), the CPU 205 causes the second external device 500 so as to supply the power to the auxiliary power source 216.

In step S419, the CPU 205 performs the wireless communication compliant with the NFC standard so as to inform the power supply device 100 of data indicating that the battery 215 has been removed from the electronic apparatus 200. Then, the CPU 205 ends the process.

In step S409, the CPU 205 determines whether the voltage of the battery 215 is equal to or higher than the first predetermined value. However, in step S409, the CPU 205 may determine whether the remaining level of the battery 215 is equal to or greater than a first remaining level.

In this case, when the CPU 205 determines that the remaining level of the battery 215 is equal to or greater than the first remaining level (YES in step S409), the process proceeds to step S410 from step S409. When the CPU 205 determines that the remaining level of the battery 215 is less than the first remaining level (NO in step S409), the CPU 205 repeats the process in step S409.

The first remaining level corresponds to the power supplied from the second external device 500 to activate the predetermined system 225 when the second external device 500 complies with the SDP.

Further, in step S408, the CPU 205 charges the battery 215 by using the power supplied from the second external device 500. However, the CPU 205 may omit the process in step S408 and perform the process in step S409 after setting the second flag f2 to ON in step S407.

At this time, the CPU 205 does not charge the battery 215 by using the power supplied from the second external device 500. However, the CPU 205 causes the second external device 500 so as to supply the power to the predetermined system 225, and activates the predetermined system 225.

Similarly, the CPU 205 may omit the process in step S415. In this case, the CPU 205 omits the process of step S415 and performs the process in step S416 after setting the third flag f3 to ON in step S414.

At this time, the CPU 205 does not charge the battery 215 by using the power supplied from the second external device 500. However, the CPU 205 causes the second external device 500 so as to supply the power to the predetermined system 225, and activates the predetermined system 225.

<Third Activation Process>

Next, a third activation process performed by the electronic apparatus 200 in the present exemplary embodiment will be described with reference to a flowchart in FIG. 5. The third activation process may be realized by the CPU 205 executing the computer program stored in the ROM 205a.

In a state where the power supply device 100 and the electronic apparatus 200 are disposed within a predetermined range of distance while the battery 215 is connected to the electronic apparatus 200, the third activation process is performed if an instruction for changing a state of the power of the electronic apparatus 200 from "OFF" to "ON" is input via the operation unit 220.

In step S501, the CPU 205 determines whether the electronic apparatus 200 may receive the power from the power supply device 100 via the power receiving antenna 201.

For example, the CPU 205 determines whether the authentication for supplying power wirelessly has been completed between the electronic apparatus 200 and the power supply device 100. When the authentication for supplying power wirelessly has been completed between the electronic apparatus 200 and the power supply device 100, the CPU 205 determines that the electronic apparatus 200 may receive the power from the power supply device 100 via the power receiving antenna 201.

On the other hand, when the authentication for supplying power wirelessly has not been completed between the electronic apparatus 200 and the power supply device 100, the CPU 205 determines that the electronic apparatus 200 cannot receive the power from the power supply device 100 via the power receiving antenna 201.

In a case where the CPU 205 determines that the electronic apparatus 200 may receive the power from the power supply device 100 via the power receiving antenna 201 (YES in step S501), the process proceeds to step S505 from step S501. In a case where the CPU 205 determines that the electronic apparatus 200 cannot receive the power from the power supply device 100 via the power receiving antenna 201 (NO in step S501), the process proceeds to step S502 from step S501.

In step S502, the CPU 205 sets the fourth flag f4 stored in the RAM 205b to OFF. Then, the process proceeds to step S503 from step S502. In a case where the information indicating that the power supply device 100 is selected is stored in the RAM 205b, the CPU 205 deletes from the RAM 205b the information indicating that the power supply device 100 is selected.

The fourth flag f4 indicates the information whether the electronic apparatus 200 may receive the power from the power supply device 100. In a case where the fourth flag f4 is ON, the CPU 205 determines that the electronic apparatus 200 may receive power from the power supply device 100. In a case where the fourth flag f4 is OFF, the CPU 205 determines that the electronic apparatus 200 cannot receive power from the power supply device 100.

In step S503, the CPU 205 stops the process performed by the predetermined system 225, and controls the regulator 213 not to supply power to the predetermined system 225. Then, the process proceeds to step S504 from step S503.

In step S504, the CPU 205 performs the wireless communication compliant with the NFC standard so as to inform the power supply device 100 of status data. The status data indicates that power supplied to the predetermined system 225 from the power supply device 100 is stopped. Then, the CPU 205 ends the process.

In step S505, the CPU 205 sets the fourth flag f4 stored in the RAM 205b to ON. Then, the process proceeds to step S506 from step S505.

In step S506, the CPU 205 selects the power supply device 100 as a device for supplying power to the electronic apparatus 200. At this time, the CPU 205 controls the switching unit 207 to supply the regulator 213 with power supplied from the power supply device 100. Then, the CPU 205 stores in the RAM 205b the information indicating that the power supply device 100 is selected. Thereafter, the process proceeds to step S507 from step S506.

In step S507, the CPU 205 controls the charging control unit 214 to charge the battery 215. The charging control unit 214 charges the battery 215 by using the power that is supplied to the charging control unit 214 and the battery 215 from the power supply device 100 via the regulator 213. Then, the process proceeds to step S508 from step S507.

In step S508, the CPU 205 determines whether the voltage of the battery 215 is equal to or higher than a second predetermined value. When the CPU 205 determines that the voltage of the battery 215 is equal to or higher than the second predetermined value (YES in step S508), the process proceeds to step S509 from step S508.

When the CPU 205 determines that the voltage of the battery 215 is lower than the second predetermined value (NO in step S508), the process repeats the process in step S508. The second predetermined value indicates a voltage value. The second predetermined value is greater than the first predetermined value. For example, the second predetermined value is 3.5 V.

In step S509, the CPU 205 controls the regulator 213 to supply power supplied from the power supply device 100 to the predetermined system 225 via the regulator 213.

Further, the CPU 205 inputs an activation signal for activating the predetermined system 225 to the system control unit 217. Through this, the system control unit 217 uses power supplied from the power supply device 100 so as to start the process for activating the predetermined system 225. Then, the process proceeds to step S510 from step S509.

In step S510, the CPU 205 performs the wireless communication compliant with the NFC standard so as to inform the power supply device 100 of status data. The status data indicates that power is supplied to the predetermined system 225 from the power supply device 100. The status data may include data relating to the battery 215. The data relating to the battery 215 indicates at least one of the remaining level of the battery 215 and a charging status of the battery 215. Then, the process proceeds to step S511 from step S510.

In step S511, the CPU 205 determines whether the electronic apparatus 200 is connected to the battery 215. When the CPU 205 determines that the electronic apparatus 200 is connected to the battery 215 (YES in step S511), the CPU 205 ends the process.

When the CPU 205 determines that the electronic apparatus 200 is not connected to the battery 215 (NO in step S511), the process proceeds to step S512 from step S511.

In step S512, the CPU 205 performs the wireless communication compliant with the NFC standard so as to inform the power supply device 100 of data indicating that the battery 215 is removed from the electronic apparatus 200. Then, the process proceeds to step S502 from step S512.

In step S508, the CPU 205 determines whether the voltage of the battery 215 is equal to or higher than the second predetermined value. However, in step S508, the CPU 205 may determine whether the remaining level of the battery 215 is equal to or greater than a second remaining level.

In this case, if the CPU 205 determines that the remaining level of the battery 215 is equal to or greater than the second remaining level (YES in step S508), the process proceeds to step S509 from step S508. On the other hand, if the CPU 205 determines that the remaining level of the battery 215 is less than the second remaining level (NO in step S508), the CPU 205 repeats the process in step S508.

The second remaining level corresponds to power supplied from the power supply device 100 to activate the predetermined system 225. The value of the second predetermined remaining level is greater than that of the first remaining level.

Further, in step S507, the CPU 205 charges the battery 215 by using power supplied from the power supply device 100. However, the CPU 205 may omit the process of step S507 and perform the process of step S508 after selecting the power supply device 100 in step S506.

At this time, the CPU 205 does not charge the battery 215 by using power supplied from the power supply device 100. However, the CPU 205 causes the power supply device 100 so as to supply power to the predetermined system 225 and activates the predetermined system 225.

<First Selection Process>

Next, a first selection process performed by the electronic apparatus 200 in the present exemplary embodiment will be described with reference to a flowchart in FIG. 6. The first selection process may be realized by the CPU 205 executing the computer program stored in the ROM 205*a*.

The CPU 205 executes the first selection process after executing any one of the first activation process, the second activation process, and the third activation process.

In step S601, the CPU 205 determines whether the power supply device 100 is selected as a device for supplying power to the electronic apparatus 200. When the CPU 205 determines that the power supply device 100 is selected as a device for supplying power to the electronic apparatus 200 (YES in step S601), the process proceeds to step S603 from step S601.

When the CPU 205 determines that the power supply device 100 is not selected as a device for supplying power to the electronic apparatus 200 (NO in step S601), the process proceeds to step S602 from step S601.

In step S602, the CPU 205 performs a second selection process. The second selection process will be described below. After the CPU 205 performs the second selection process, the CPU 205 ends the process.

In step S603, the CPU 205 determines whether the first flag f1 stored in the RAM 205*b* is set to ON. When the CPU 205 determines that the first flag f1 is set to ON (YES in step S603), the process proceeds to step S604 from step S603. When the CPU 205 determines that the first flag f1 is set to OFF (NO in step S603), the processing proceeds to step S607 from step S603.

In step S604, the CPU 205 selects the first external device 300 as a device for supplying power to the electronic apparatus 200. Then, the CPU 205 controls the switching unit 207 to supply the regulator 213 with power supplied from the first external device 300.

In addition, the CPU 205 deletes from the RAM 205*b* the information indicating that the power supply device 100 is selected, and records onto the RAM 205*b* the information indicating that the first external device 300 is selected. Then, the process proceeds to step S605 from step S604.

In step S605, the CPU 205 controls the regulator 213 to supply power supplied from the first external device 300 to the predetermined system 225 via the regulator 213. In a case where the process for activating the predetermined system 225 is not performed, the CPU 205 inputs an activation signal to the system control unit 217. Thereafter, the process proceeds to step S606 from step S605.

In step S606, the CPU 205 performs the wireless communication compliant with the NFC standard so as to inform the power supply device 100 of status data. The status data indicates that power is supplied to the predetermined system 225 from the first external device 300. Then, the CPU 205 ends the process.

In step S607, the CPU 205 determines whether the third flag f3 stored in the RAM 205*b* is set to ON. When the CPU 205 determines that the third flag f3 is set to ON (YES in step S607), the process proceeds to step S608 from step S607.

When the CPU 205 determines that the third flag f3 is set to OFF (NO in step S607), the process proceeds to step S611 from step S607.

In step S608, the CPU 205 selects the second external device 500 as a device for supplying power to the electronic apparatus 200. Then, the CPU 205 controls the switching unit 207 to supply the regulator 213 with the supplied from the second external device 500.

In addition, the CPU 205 deletes from the RAM 205*b* the information indicating that the power supply device 100 is selected, and records onto the RAM 205*b* the information indicating that the second external device 500 is selected. Then, the process proceeds to step S609 from step S608.

In step S609, the CPU 205 controls the regulator 213 to supply power supplied from the second external device 500 to the predetermined system 225 via the regulator 213. In a case where the process for activating the predetermined system 225 is not performed, the CPU 205 inputs an activation signal to the system control unit 217. Then, the process proceeds to step S610 from step S609.

In step S610, the CPU 205 performs the wireless communication compliant with the NFC standard so as to inform the power supply device 100 of status data. The status data indicates that is supplied to the predetermined system 225 from the second external device 500. Then, the CPU 205 ends the process.

In step S611, the CPU 205 determines whether the second flag f2 stored in the RAM 205*b* is set to ON. When the CPU 205 determines that the second flag f2 is set to ON (YES in step S611), the process proceeds to step S612 from step S611. When the CPU 205 determines that the second flag f2 is set to OFF (NO in step S611), the CPU 205 ends the process.

In step S612, the CPU 205 determines whether the voltage of the battery 215 is equal to or higher than the second predetermined value. When the CPU 205 determines that the voltage of the battery 215 is equal to or higher than the second predetermined value (YES in step S612), the CPU 205 ends the process.

When the CPU 205 determines that the voltage of the battery 215 is lower than the second predetermined value (NO in step S612), the process proceeds to step S613 from step S612.

In step S613, the CPU 205 selects the second external device 500 as a device for supplying power to the electronic apparatus 200. Then, the CPU 205 controls the switching unit 207 to supply the regulator 213 with power supplied from the second external device 500.

Further, the CPU 205 deletes from the RAM 205b the information indicating that the power supply device 100 is selected, and records onto the RAM 205b the information indicating that the second external device 500 is selected. Thereafter, the process proceeds to step S614 from step S613.

In step S614, the CPU 205 controls the charging control unit 214 to charge the battery 215. The charging control unit 214 charges the battery 215 by using power supplied to the charging control unit 214 and the battery 215 from the second external device 500 via the regulator 213. Thereafter, the process proceeds to step S615 from step S614.

In step S615, the CPU 205 determines whether the voltage of the battery 215 is equal to or higher than the first predetermined value. When the CPU 205 determines that the voltage of the battery 215 is equal to or higher than the first predetermined value (YES in step S615), the process proceeds to step S616 from step S615. When the CPU 205 determines that the voltage of the battery 215 is not higher than the first predetermined value (NO in step S615), the process returns to step S614 from step S615.

In step S616, the CPU 205 controls the regulator 213 to supply power supplied from the second external device 500 to the predetermined system 225 via the regulator 213. Further, in a case where the process for activating the predetermined system 225 is not performed, the CPU 205 inputs an activation signal to the system control unit 217. Then, the process proceeds to step S617 from step S616.

In step S617, the CPU 205 performs the wireless communication compliant with the NFC standard so as to inform the power supply device 100 of status data. The status data indicates that power is supplied to the predetermined system 225 from the second external device 500. Thereafter, the CPU 205 ends the process.

In step S615, the CPU 205 determines whether the voltage of the battery 215 is equal to or higher than the first predetermined value. However, in step S615, the CPU 205 may determine whether the remaining level of the battery 215 is equal to or greater than the first remaining level.

In this case, when the CPU 205 determines that the remaining level of the battery 215 is equal to or greater than the first remaining level (YES in step S615), the process proceeds to step S616 from step S615. On the other hand, when the CPU 205 determines that the remaining level of the battery 215 is lower than the first remaining level (NO in step S615), the process returns to step S614 from step S615.

Further, in step S614, the CPU 205 charges the battery 215 by using power supplied from the second external device 500. However, the CPU 205 may omit the process in step S614 and performs the process in step S615 after selecting the second external device 500 in step S613.

<Second Selection Process>

Next, a second selection process performed by the electronic apparatus 200 in step S602 of FIG. 6 in the present exemplary embodiment will be described with reference to a flowchart in FIG. 7. The second selection process may be realized by the CPU 205 executing the computer program stored in the ROM 205a.

The CPU 205 may execute the second selection process after executing any one of the first activation process, the second activation process, and the third activation process. The processing performed in steps S704 through S706 is similar to the process performed in steps S604 through S606. Therefore, the descriptions thereof will be omitted.

In step S701, the CPU 205 determines whether the first external device 300 is selected as a device for supplying power to the electronic apparatus 200. When the CPU 205 determines that the first external device 300 is selected as a device for supplying power to the electronic apparatus 200 (YES in step S701), the CPU 205 ends the process.

When the CPU 205 determines that the first external device 300 is not selected as a device for supplying power to the electronic apparatus 200 (NO in step S701), the process proceeds to step S702 from step S701.

In step S702, the CPU 205 determines whether the second external device 500 is selected as a device for supplying power to the electronic apparatus 200. When the CPU 205 determines that the second external device 500 is selected as a device for supplying power to the electronic apparatus 200 (YES in step S702), the process proceeds to step S703 from step S702.

When the CPU 205 determines that the second external device 500 is not selected as a device for supplying power to the electronic apparatus 200 (NO in step S702), the CPU 205 ends the process.

In step S703, the CPU 205 determines whether the first flag f1 stored in the RAM 205b is set to ON. When the CPU 205 determines that the first flag f1 is set to ON (YES in step S703), the process proceeds to step S704 from step S703.

When the CPU 205 determines that the first flag f1 is set to OFF (NO in step S703), the process proceeds to step S707 from step S703.

In step S707, the CPU 205 determines whether the second external device 500 complies either with the CDP or the DCP. When the CPU 205 determines that the second external device 500 complies either with the CDP or the DCP (YES in step S707), the CPU 205 ends the process.

When the CPU 205 determines that the second external device 500 complies neither with the CDP nor the DCP (NO in step S707), the process proceeds to step S708 from step S707.

In step S708, the CPU 205 determines whether the fourth flag f4 stored in the RAM 205b is set to ON. When the CPU 205 determines that the fourth flag f4 is set to ON (YES in step S708), the process proceeds to step S709 from step S708.

When the CPU 205 determines that the fourth flag f4 is set to OFF (NO in step S708), the CPU 205 ends the process.

In step S709, the CPU 205 selects the power supply device 100 as a device for supplying power to the electronic apparatus 200. Then, the CPU 205 controls the switching unit 207 to supply the regulator 213 with power supplied from the power supply device 100.

Further, the CPU 205 deletes from the RAM 205b the information indicating that the second external device 500 is selected, and records onto the RAM 205b the information indicating that the power supply device 100 is selected. Thereafter, the process proceeds to step S710 from step S709.

In step S710, the CPU 205 controls the charging control unit 214 to charge the battery 215. Then, the charging control unit 214 charges the battery 215 by using power supplied to the charging control unit 214 and the battery 215 from the power supply device 100 via the regulator 213. Thereafter, the process proceeds to step S711.

In step S711, the CPU 205 determines whether the voltage of the battery 215 is equal to or higher than the first predetermined value. When the CPU 205 determines that the voltage of the battery 215 is equal to or higher than the first predetermined value (YES in step S711), the process proceeds to step S712 from step S711.

When the CPU 205 determines that the voltage of the battery 215 is lower than the first predetermined value (NO in step S711), the process returns to step S710 from step S711.

In step S712, the CPU 205 controls the regulator 213 so that power supplied from the power supply device 100 is supplied to the predetermined system 225 via the regulator 213. Further, in a case where the process for activating the predetermined system 225 is not performed, the CPU 205 inputs an activation signal to the system control unit 217. Then, the process proceeds to step S713 from step S712.

In step S713, the CPU 205 determines whether the voltage of the battery 215 is equal to or higher than the second predetermined value. When the CPU 205 determines that the voltage of the battery 215 is equal to or higher than the second predetermined value (YES in step S713), the process proceeds to step S714 from step S713.

When the CPU 205 determines that the voltage of the battery 215 is lower than the second predetermined value (NO in step S713), the process returns to step S712 from step S713.

In step S714, the CPU 205 performs the wireless communication compliant with the NFC standard so as to inform the power supply device 100 of status data. The status data indicates that power is supplied to the predetermined system 225 from the power supply device 100. Then, the CPU 205 ends the process.

In step S711, the CPU 205 determines whether the voltage of the battery 215 is equal to or higher than the first predetermined value. However, in step S711, the CPU 205 may determine whether the remaining level of the battery 215 is equal to or greater than the first remaining level. In this case, when the CPU 205 determines that the remaining level of the battery 215 is equal to or greater than the first remaining level (YES in step S711), the process proceeds to step S712 from step S711.

When the CPU 205 determines that the remaining level of the battery 215 is less than the first remaining level (NO in step S711), the process returns to step S710 from step S711.

Further, in step S713, the CPU 205 determines whether the voltage of the battery 215 is equal to or higher than the second predetermined value. However, in step S713, the CPU 205 may determine whether the remaining level of the battery 215 is equal to or greater than the second remaining level.

In this case, when the CPU 205 determines that the remaining level of the battery 215 is equal to or greater than the second remaining level (YES in step S713), the process proceeds to step S714 from step S713. On the other hand, when the CPU 205 determines that the remaining level of the battery 215 is less than the second remaining level (NO in step S713), the CPU 205 repeats the process in step S713.

Further, in step S710, the CPU 205 charges the battery 215 by using power supplied from the power supply device 100. However, the CPU 205 may omit the process in step S710 and perform the process in step S711 after selecting the power supply device 100 in step S709.

In the electronic apparatus 200 according to the present exemplary embodiment, a device for supplying power to the electronic apparatus 200 is selected according to the type of the external device capable of supplying power to the electronic apparatus 200 and the voltage of the battery 215 connected to the electronic apparatus 200.

Further, in the electronic apparatus 200, power is supplied to the predetermined system 225 from the selected device, and thus, power will not be supplied to the predetermined system 225 from non-selected devices.

Accordingly, the electronic apparatus 200 may select a proper device for supplying power to the predetermined system 225. Through this, in a case where power is supplied to the electronic apparatus 200 from a plurality of external devices, the electronic apparatus 200 may be prevented from being supplied with an excessive amount of power because one device is selected from among the plurality of external devices.

In a case where the first external device 300 may supply power to the electronic apparatus 200, the electronic apparatus 200 selects the first external device 300 even if the electronic apparatus 200 has selected either the second external device 500 or the power supply device 100.

In this case, regardless of the voltage value of the battery 215, the electronic apparatus 200 may activate the predetermined system 225 by causing the first external device 300 to supply power to the predetermined system 225.

Further, in a case where the second external device 500 corresponding either to the CDP or the DCP may supply power to the electronic apparatus 200, the electronic apparatus 200 selects the second external device 500 even if the electronic apparatus 200 has selected the power supply device 100.

At this time, regardless of the voltage value of the battery 215, the electronic apparatus 200 may activate the predetermined system 225 by causing the second external device 500 so as to supply power to the predetermined system 225.

Further, in a case where the second external device 500 compliant with the SDP may supply power to the electronic apparatus 200 while the voltage of the battery 215 is lower than the second predetermined value, the electronic apparatus 200 selects the second external device 500 even if the electronic apparatus 200 has selected the power supply device 100.

In this case, after it has been determined that the voltage of the battery 215 is equal to or higher than the first predetermined value, the electronic apparatus 200 may activate the predetermined system 225 by causing the second external device 500 so as to supply power to the predetermined system 225.

At this time, the electronic apparatus 200 charges the battery 215 until the voltage of the battery 215 becomes equal to or higher than the second predetermined value. This is because power supplied to the predetermined system 225 from the power supply device 100 possibly be unstable if the power supply device 100 supplies power to the predetermined system 225 while the voltage of the battery 215 is lower than the second predetermined value.

Therefore, in a case where the second external device 500 compliant with the SDP may supply power to the electronic apparatus 200, the electronic apparatus 200 causes the second external device 500 so as to supply the predetermined system 225 with power until the voltage of the battery 215 reaches at least equal to or higher than the second predetermined value.

Further, the electronic apparatus 200 selects the power supply device 100 if the power supply device 100 may supply power to the electronic apparatus 200 even though the second external device 500 compliant with the SDP has been selected.

In this case, after it has been determined that the voltage of the battery 215 is equal to or higher than the first predetermined value, the electronic apparatus 200 may activate the predetermined system 225 by causing the power supply device 100 so as to supply power to the predetermined system 225.

At this time, the electronic apparatus 200 charges the battery 215 until the voltage of the battery 215 becomes equal to or higher than the first predetermined value. In this case, even if power from the power supply device 100 becomes unstable, the electronic apparatus 200 may supply the predetermined system 225 with power supplied from the second external device 500 compliant with the SDP.

Then, after it has been determined that the voltage of the battery 215 is equal to or higher than the first predetermined value, the electronic apparatus 200 causes the power supply device 100 so as to supply power to the predetermined system 225 and activates the predetermined system 225.

In the present exemplary embodiment, the predetermined system 225 included in the electronic apparatus 200 has been described. However, the predetermined system 225 is not limited thereto. For example, as illustrated in FIG. 8, the predetermined system 225 may be included in a third external device 700 connected to the electronic apparatus 200 via an interface 600 instead of being included in the electronic apparatus 200.

Figure 3:
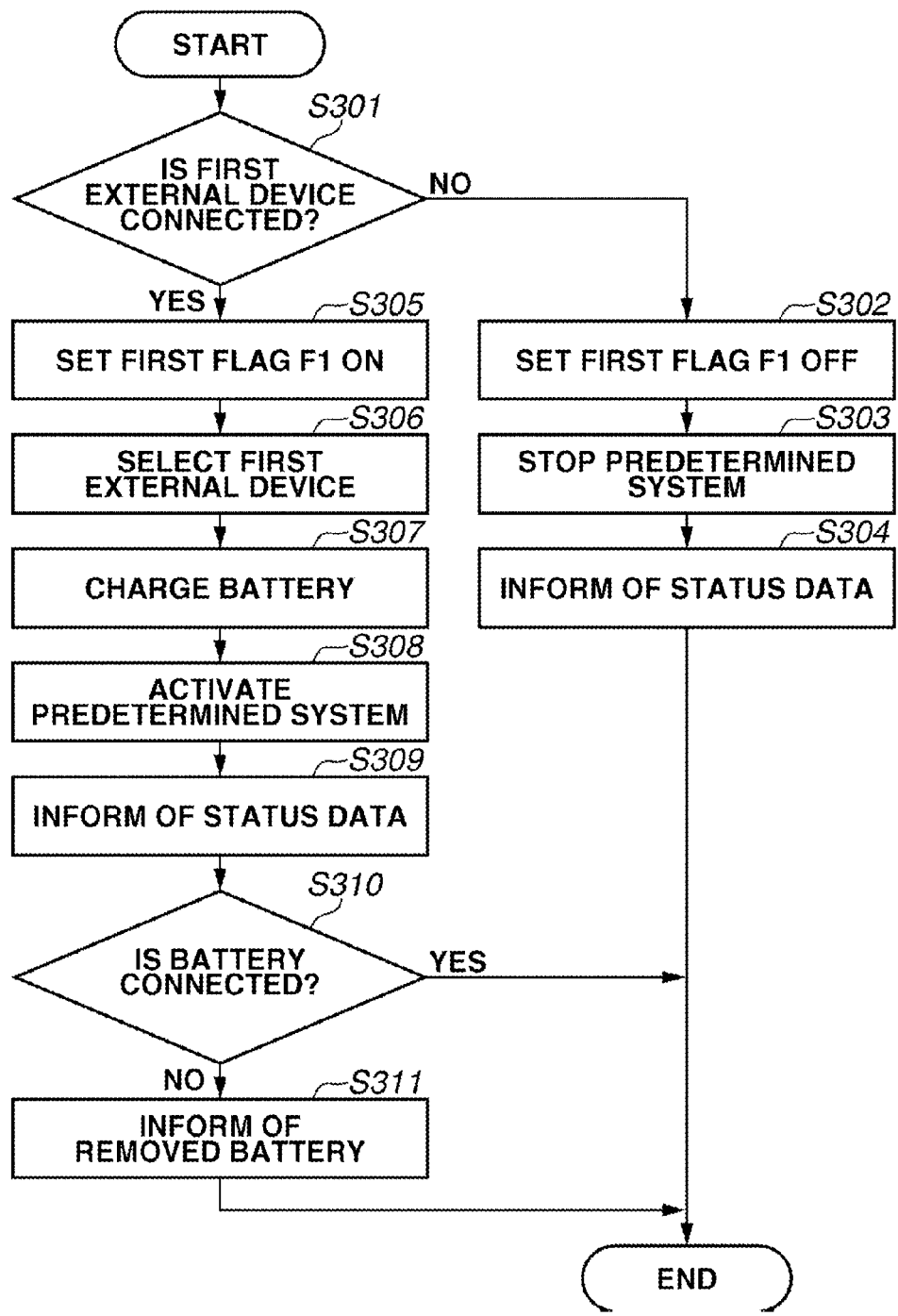
FIG. 3 is a flowchart illustrating an example of a first activation process performed by the electronic apparatus according to the first exemplary embodiment.
Figure 4:
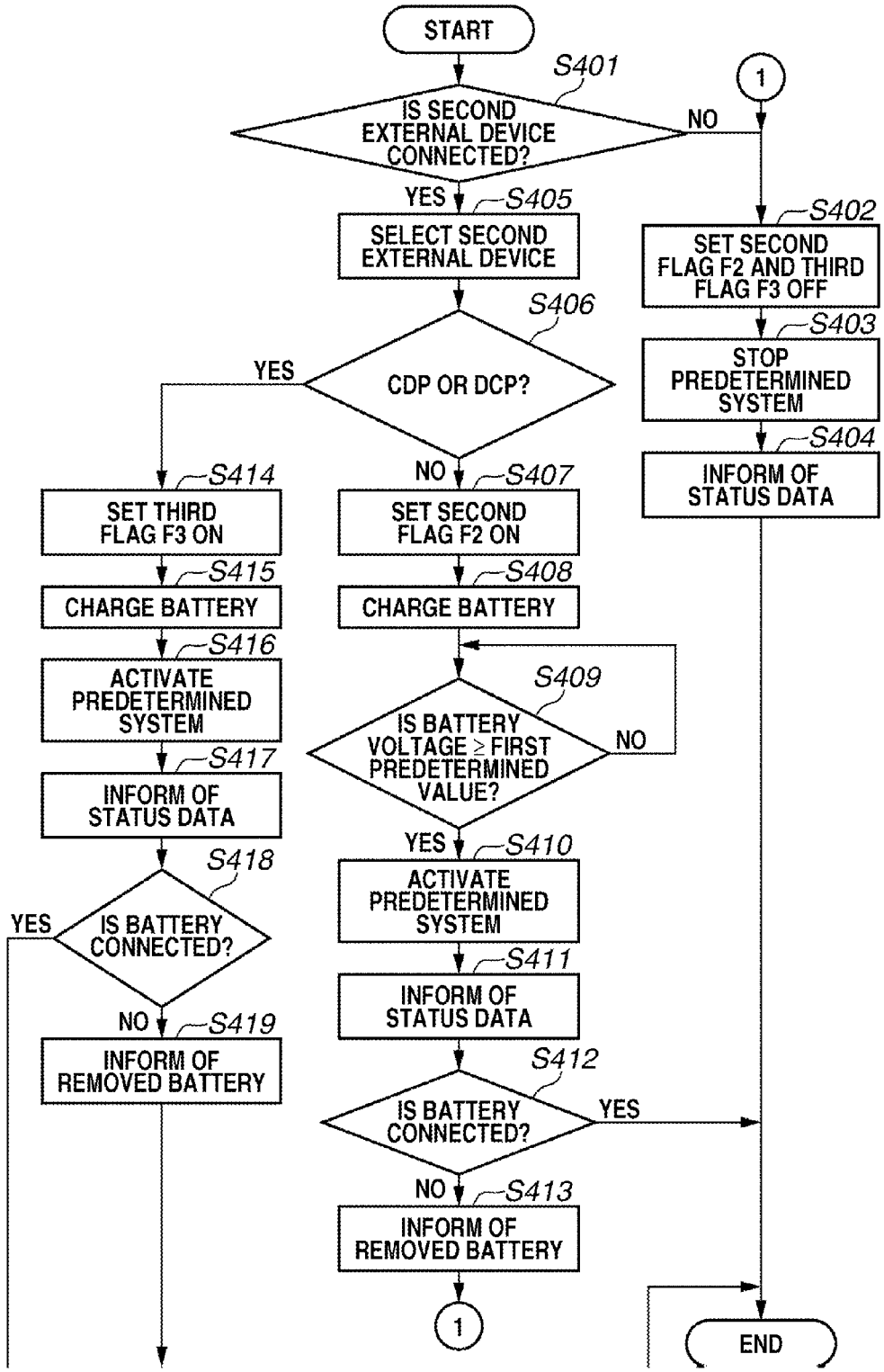
FIG. 4 is a flowchart illustrating an example of a second activation process performed by the electronic apparatus according to the first exemplary embodiment.
Figure 5:
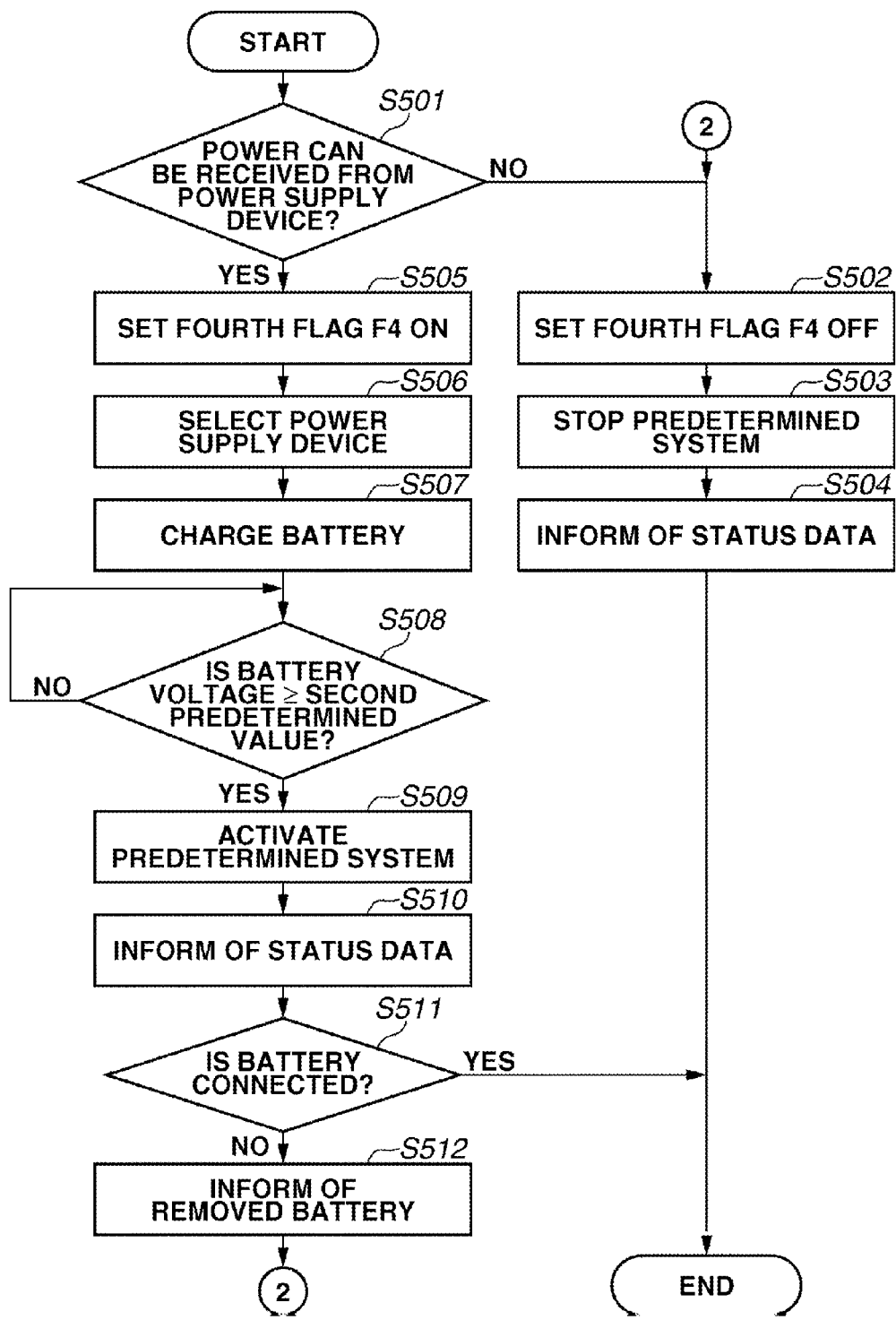
FIG. 5 is a flowchart illustrating an example of a third activation process performed by the electronic apparatus according to the first exemplary embodiment.
Figure 6:
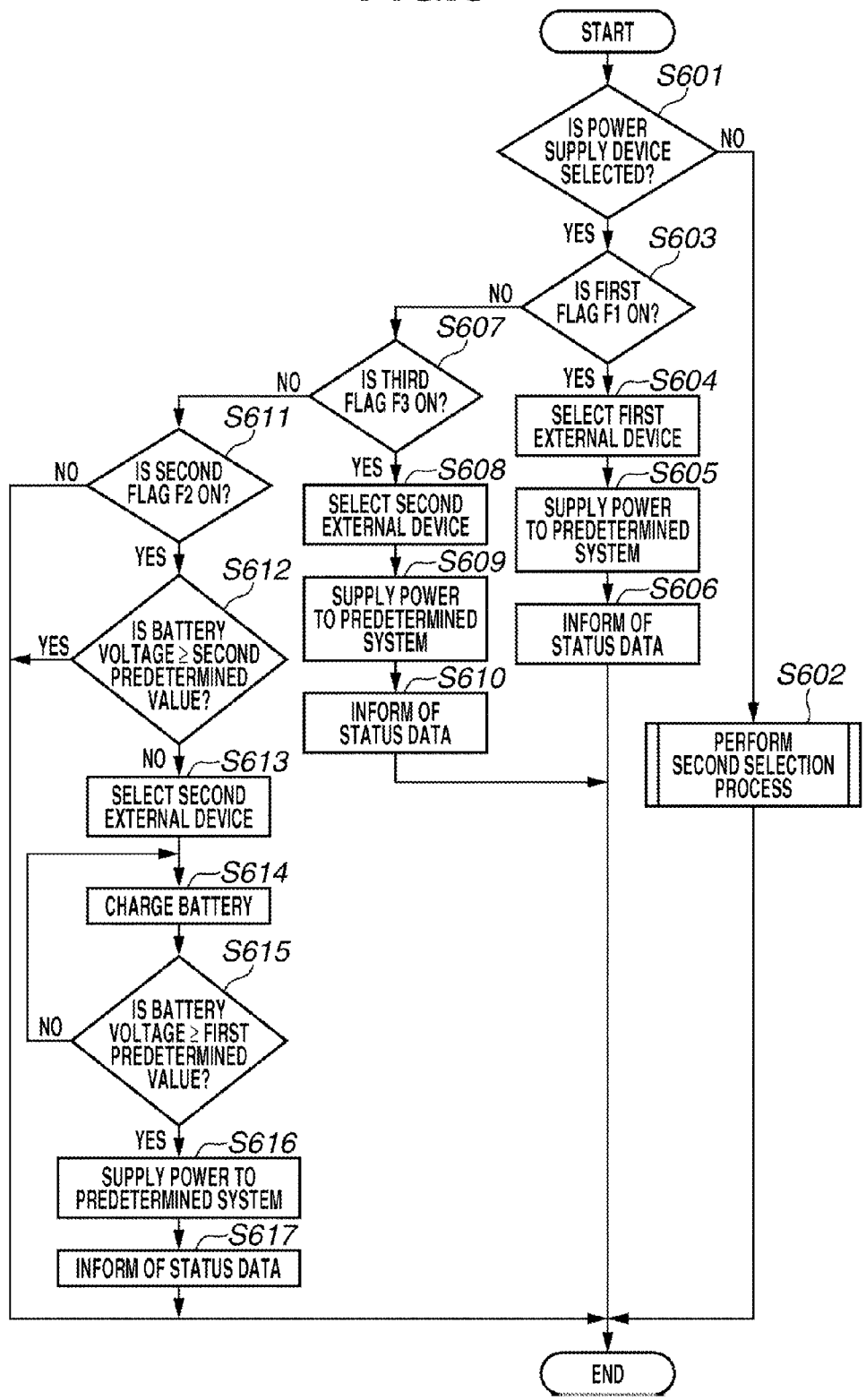
FIG. 6 is a flowchart illustrating an example of a first selection process performed by the electronic apparatus according to the first exemplary embodiment.
Figure 7:
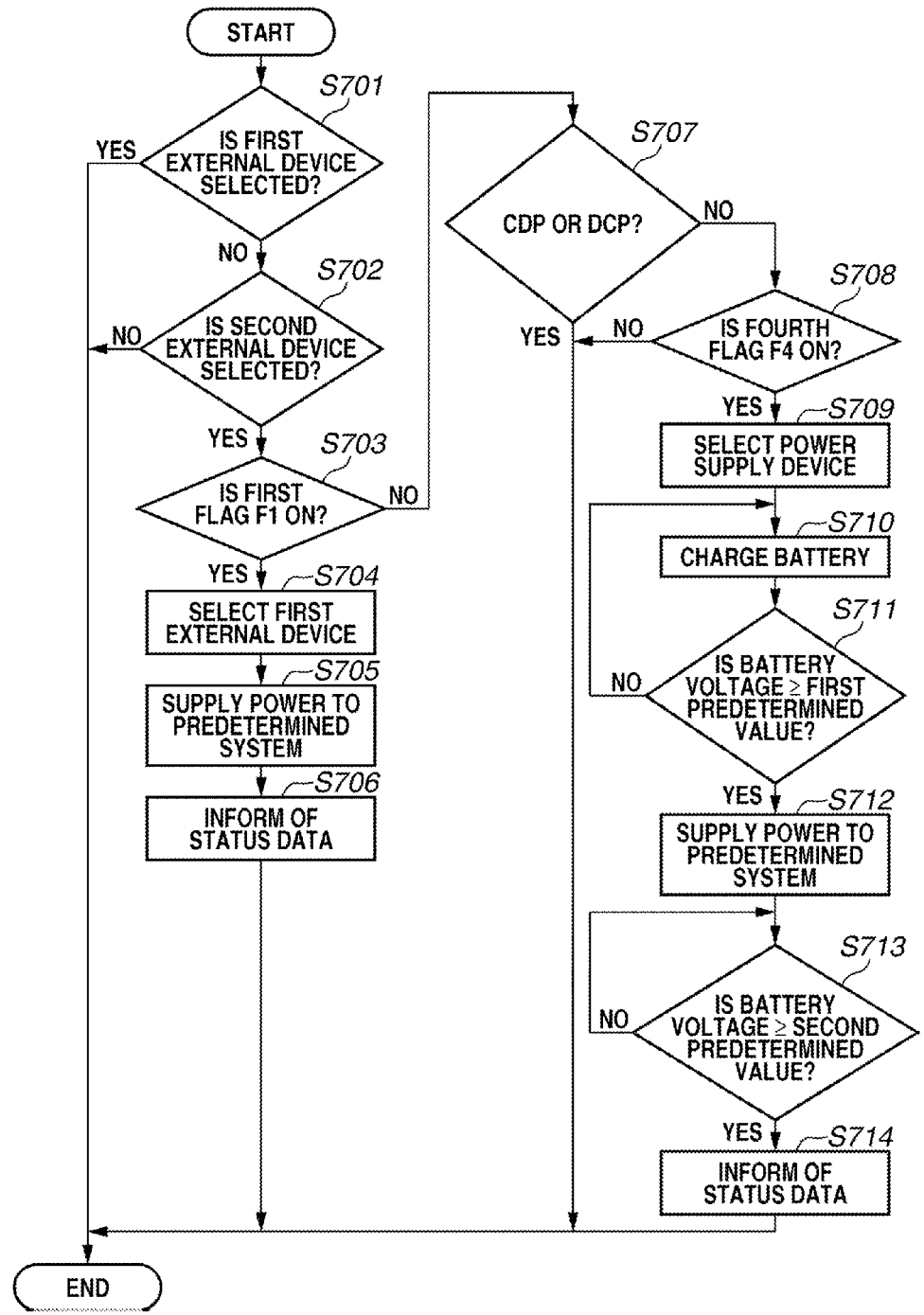
FIG. 7 is a flowchart illustrating an example of a second selection process performed by the electronic apparatus according to the first exemplary embodiment.
Figure 8:
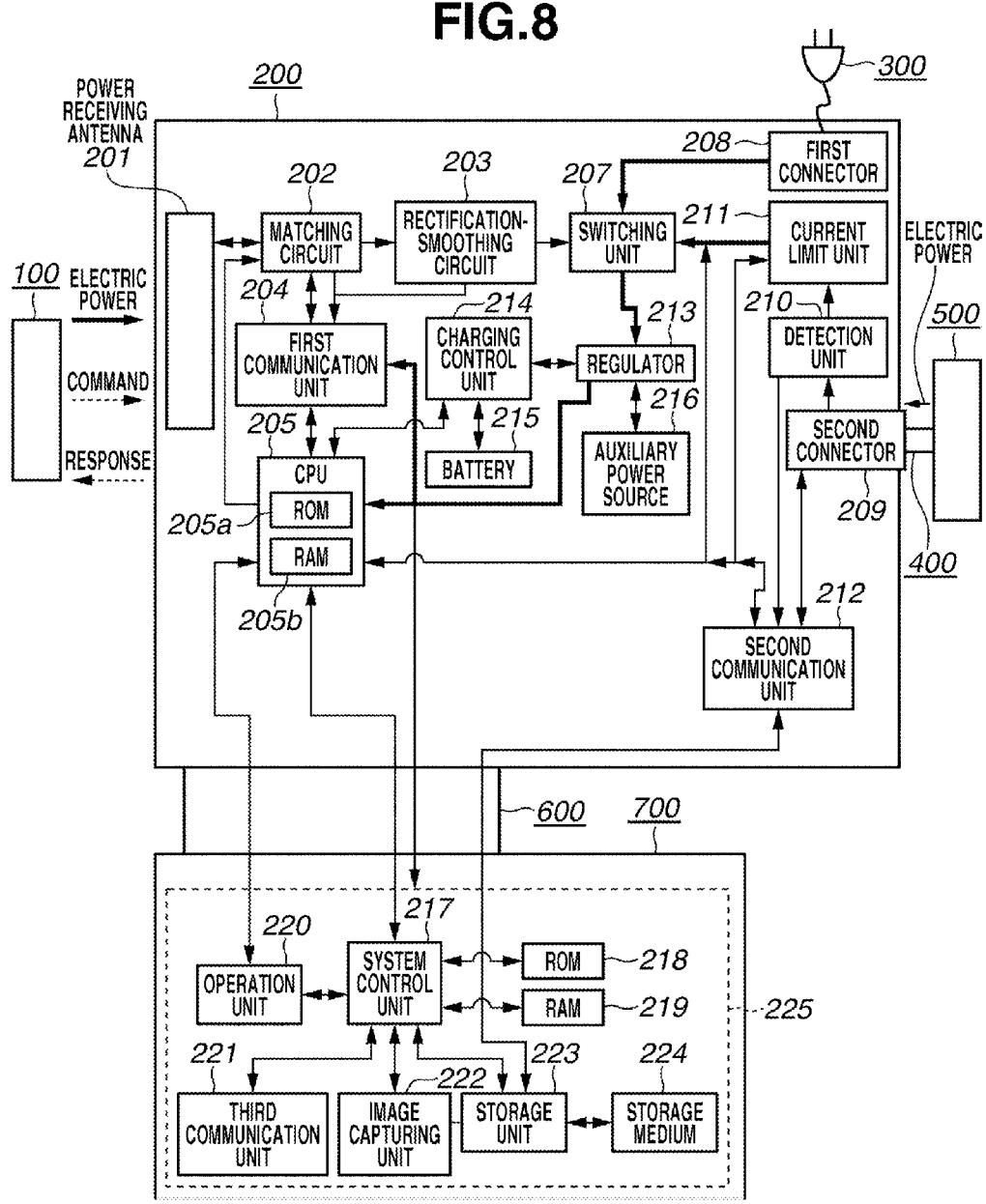
FIG. 8 is a block diagram illustrating an example of a power supply system according to a second exemplary embodiment.

With the system as illustrated in FIG. 8, the electronic apparatus 200 may perform the first activation process illustrated in FIG. 3, the second activation process illustrated in FIG. 4, the third activation process illustrated in FIG. 5, the first selection process illustrated in FIG. 6, and the second selection process illustrated in FIG. 7.

In the present exemplary embodiment, the electronic apparatus 200 performing the wireless communication compliant with the NFC standard has been described. However, the wireless communication is not limited thereto. For example, the electronic apparatus 200 may perform wireless communication compliant with the ISO/IEC 18092 standard such as Radio Frequency Identification (RFID), or wireless communication compliant with the standard for Transfer Jet (R). Further, the electronic apparatus 200 may perform wireless communication compliant with the standard for MIFARE (R), or wireless communication compliant with the standard for FeliCa (R).

In addition, the cable 400 may be compliant with a standard other than the USB standard.

Aspects of the embodiments may also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the disclosure.

While the disclosure has been described with reference to exemplary embodiments, it is to be understood that the disclosure is not limited to the disclosed exemplary embodiments. The scope of the following claims is to be accorded the broadest interpretation so as to encompass all modifications, equivalent structures, and functions.

This application claims priority from Japanese Patent Application No. 2012-027539 filed Feb. 10, 2012, which is hereby incorporated by reference herein in its entirety.

What is claimed is:

1. An electronic apparatus comprising:
   a connection unit configured to connect to a first power supply device via a universal serial bus (USB);
   a power receiving unit configured to receive power from a second power supply device wirelessly;
   a selection unit configured to select a power supply device from the first power supply device and the second power supply device based on a power supply capacity of the first power supply device, the power supply capacity including at least a low capacity and a high capacity; and
   a control unit that performs a predetermined process using power received from the selected power supply device, wherein the predetermined process includes a process for charging a battery connected to the electronic apparatus,
   wherein, in a case where the first power supply device has been selected and the second power supply device becomes available for supplying power wirelessly, the selection unit selects the first power supply device as the power supply device if the power supply capacity corresponds to the high capacity.

2. The electronic apparatus according to claim 1,
   wherein the selection unit selects the first power supply device if a maximum current supplied to the electronic apparatus from the first power supply device is greater than a predetermined current, and
   wherein the selection unit selects the second power supply device if the maximum current supplied to the electronic apparatus from the first power supply device is less than or equal to the predetermined current.

3. The electronic apparatus according to claim 1,
   wherein the selection unit selects the first power supply device or the second power supply device based on a remaining level of the battery if a maximum current supplied to the electronic apparatus from the first power supply device is less than a predetermined current.

4. The electronic apparatus according to claim 3,
   wherein the selection unit selects the second power supply device if the maximum current supplied to the electronic apparatus from the first power supply device is less than or equal to the predetermined current and the remaining level of the battery is equal to or greater than a predetermined value, and
   wherein the selection unit selects the first power supply device if the maximum current supplied to the electronic apparatus from the first power supply device is less than or equal to the predetermined current and the remaining level of the battery is less than the predetermined value.

5. The electronic apparatus according to claim 1,
   wherein the selection unit selects a third power supply device instead of selecting the first power supply device or the second supply device if the third power supply device is connected to the electronic apparatus.

6. The electronic apparatus according to claim 1, further comprising:
   a load unit,
   wherein the control unit starts a process for activating the load unit if the first power supply device is selected and a remaining level of the battery is equal to or greater than a first predetermined value,
   wherein the control unit starts a process for operating the load unit if the second power supply device is selected and the remaining level of the battery is equal to or greater than a second predetermined value, and wherein the first predetermined value is smaller than the second predetermined value.

7. The electronic apparatus according to claim 5, further comprising:
a load unit,
wherein the control unit starts a process for operating the load unit if the third power supply device is selected.

8. The electronic apparatus according to claim 1, wherein the first power supply device includes a device for supplying power to the electronic apparatus via a USB.

9. The electronic apparatus according to claim 1, wherein the first power supply device includes a USB host.

10. The electronic apparatus according to claim 5, wherein the third power supply device includes an alternating current (AC) adaptor.

11. The electronic apparatus according to claim 1, further comprising:
a resonance unit that controls a resonant frequency of the power receiving unit.

12. The electronic apparatus according to claim 11, wherein the resonance unit matches the resonant frequency of the power receiving unit to a resonant frequency of the second supply device.

13. The electronic apparatus according to claim 1, further comprising:
a communication unit that transmits data indicating the power supply device selected by the selection unit to the second power supply device.

14. The electronic apparatus according to claim 13, wherein
the communication unit transmits data relating to the battery to the second power supply device.

15. The electronic apparatus according to claim 14, wherein the data relating to the battery includes data indicating whether or not the battery and the electronic apparatus are connected.

16. The electronic apparatus according to claim 14, wherein the data relating to the battery includes data indicating a remaining level of the battery or data indicating a charging status of the battery.

17. The electronic apparatus according to claim 13, wherein
the communication unit transmits data, which indicates that a supply of power from the first power supply device is stopped to the second power supply device if the first power supply device and the electronic apparatus are disconnected.

18. The electronic apparatus according to claim 1, wherein
the selection unit selects a power supply device which supplies a predetermined power to the electronic apparatus based on whether or not the first power supply device and the electronic apparatus are connected, and wherein the predetermined power is used for performing the predetermined process.

19. A method comprising:
selecting a power supply device from a first power supply device and a second power supply device, based on a power supply capacity of the first power supply device the power supply capacity including at least a low capacity and a high capacity; and performing a predetermined process using power received from the selected power supply device, wherein the predetermined process includes a process for charging a battery connected to an electronic apparatus including a connection unit configured to connect to a first power supply device via a universal serial bus (USB), wherein, in a case where the first power supply device has been selected and the second power supply device becomes available for supplying power, selecting comprises selecting the first power supply device as the power supply device if the power supply capacity corresponds to the high capacity.

20. A non-transitory storage medium that stores a program for causing a computer to execute a method, the method comprising:
selecting a power supply device from a first power supply device and a second power supply device, based on a power supply capacity of the first power supply device the power supply capacity including at least a low capacity and a high capacity; and performing a predetermined process using power received from the selected power supply device, wherein the predetermined process includes a process for charging a battery connected to an electronic apparatus including a connection unit configured to connect to a first power supply device via a universal serial bus (USB), wherein, in a case where the first power supply device has been selected and the second power supply device becomes available for supplying power, selecting comprises selecting the first power supply device as the power supply device if the power supply capacity corresponds to the high capacity.

* * * * *